United States Patent [19]

Shimokawa et al.

[11] 4,314,041

[45] Feb. 2, 1982

[54] CONTINUOUS MULTI-ZONE GRAFT POLYMERIZATION

[75] Inventors: Shin-ichi Shimokawa, Yokkaichi; Yuji Yamamoto, Suzuka, both of Japan

[73] Assignee: Japan Synthetic Rubber Co., Ltd., Tokyo, Japan

[21] Appl. No.: 190,950

[22] Filed: Sep. 26, 1980

[30] Foreign Application Priority Data

Oct. 1, 1979 [JP] Japan .............................. 54-125351

[51] Int. Cl.$^3$ ............................................ C08F 255/06
[52] U.S. Cl. ...................................... 525/53; 525/242; 525/263; 525/265
[58] Field of Search ........................................... 525/53

[56] References Cited

U.S. PATENT DOCUMENTS 3,671,608  6/1972  Meredith et al. .................... 525/289
3,876,727  4/1975  Meredith et al. ...................... 525/53

*Primary Examiner*—Stanford M. Levin
*Attorney, Agent, or Firm*—Oblon, Fisher, Spivak, McClelland & Maier

[57] ABSTRACT

In a process for continuously producing an impact-resistant resin containing 5 to 30% by weight of a rubber by the solution-graft-polymerization of a monomer mixture of an aromatic vinyl compound and a vinyl cyanide compound in the presence of an ethylene-propylene-non-conjugated diene terpolymer rubber in an inert solvent comprising as essential component an aromatic hydrocarbon, two or more polymerizers connected in series are used; said rubber is fed to the first polymerizer in the form of a homogeneous solution in a part or whole of said monomers and/or said inert solvent, together with the remaining monomer or monomers and/or inert solvent; the rubber is kept in the dispersed state in the first polymerizer; said monomers are polymerized therein with stirring until the polymerization conversion reaches 40 to 80% by weight based on the monomers, and the remaining monomers are further polymerized with stirring in the second and succeeding polymerizers to substantially complete the polymerization. The resin prepared by the above improved method is excellent in gloss, hardness, chemical resistance and, in addition, in weather resistance and impact resistance.

15 Claims, No Drawings

CONTINUOUS MULTI-ZONE GRAFT POLYMERIZATION

This invention relates to a process for producing rubber-modified thermoplastic resins possessing excellent weather resistance and impact resistance. More particularly, it relates to a process for the continuous solution-graft-polymerization of a monomer mixture of an aromatic vinyl compound and a vinyl cyanide compound in the presence of an ethylene-propylene-nonconjugated diene terpolymer rubber (hereinafter sometimes referred to as EPDM).

As compared with the so-called ABS resin which is an aromatic vinyl compound-vinyl cyanide compound copolymer modified with an unsaturated rubber-like polymer such as polybutadiene, a resin (AES resin) formed by substituting an EPDM for the unsaturated polymer in said ABS resin is improved in weather resistance, which is an important disadvantage of the ABS resin, while retaining the excellent properties characteristic of the ABS resin.

Regarding the process for the production of AES resins, a large number of proposals have heretofore been disclosed in patents and other literature references. At present, emulsion polymerization is generally used in the commercial production of ABS resins, whereas in the case of AES resins emulsion polymerization is not popular and bulk polymerization or solution polymerization prevails, because EPDM in the latex form is difficult to obtain and is costly.

Although many techniques have been disclosed also for the production of AES resins, most of them are based on the knowledge regarding the batchwise polymerization. In the solution polymerization for producing AES resins, since the starting reactant solution is already viscous to some extent and as for the solution after completion of the reaction the viscosity becomes very high, it follows that both the feeding to the polymerizer and the discharge therefrom are difficult and time-consuming and, moreover, the temperature control in heating and cooling during the progress of polymerization becomes complicated, giving rise to unsteadiness in the product quality from batch to batch. On account of the problems as enumerated above, the batchwise polymerization process is not advisable for the commercial scale production.

It is, therefore, desirous to produce efficiently the AES resin by the continuous polymerization process and the technical development of such a process should be very important. However, there is very little information available on this item.

The continuous solution polymerization for producing the AES resin presents two important problems different from the problems in batchwise polymerization. One of the two problems is that there is a residence time distribution in the case of continuous polymerization, as contrasted to the batchwise polymerization in which the whole polymerization system uniformly undergoes the identical reaction history. It is well known that in the conventional continuous polymerization of monomers in a homogeneous system, the molecular weight distribution in the resulting high polymer is varied corresponding to a difference in residence time distribution in the polymerization process. In the case of an AES resin, however, in addition to the resin-forming reaction there occurs a graft-polymerization by which the resulting resin phase polymer is further grafted onto the EPDM, and which greatly affects the product quality. As a consequence, in the continuous polymerization for producing an AES resin, depending upon the residence time distribution, the grafting degree distribution is varied, namely the grafting degree of one EPDM molecule is different from that of another EPDM molecule or the grafting degree of one rubber particle is different from that of another rubber particle. For this reason, even if the average grafting degree has reached a certain level, there still remains possibly a portion of the resin with insufficient grafting degree. Such non-uniformity may cause deterioration in impact resistance, chemical resistance and delamination resistance of the AES resin. Another important problem relates to the phase transition (or phase separation). When the solution-polymerization for producing a rubber-modified thermoplastic resin is carried out in a batchwise manner, it is conventional that the rubber is fed in the form of a homogeneous solution in vinyl monomer and solvent, but is allowed to separate from the solution on the way of polymerization to form a discontinuous phase of rubber particles (that is, phase transition), and the further polymerization and the stirring effect gives the final dispersion state of rubber particles. The same principle applies also to the solution polymerization for producing an AES resin. Even in the continuous polymerization, the phase transition can be caused in some stage of polymerization because the polymerization system is in phase equilibrium which is determined depending upon the quantity of rubber, the quantity of the resin phase polymer formed by polymerization, the quantity of solvent, and the solubility parameter of each component in the polymerization system, whereby a rubber particle dispersion can be obtained. In a batchwise polymerization, however, every portion of the polymerization system has the same grafting degree before the phase transition is caused and the whole system is simultaneously subjected to phase transition with the same reaction history. Moreover, the agitation history before and after the phase transition is the same in each portion of the system, and hence, particles of comparatively uniform size tend to be obtained, resulting in formation of good physical properties of the product. In the continuous polymerization, on the other hand, owing to the influence of residence time distribution, the particles tend to become non-uniform in size and form and too large in the average size and may contain partially coarse particles, leading to inferior gloss and reduced hardness of the fabricated articles.

As described above, the continuous solution polymerization for producing a rubber-modified thermoplastic resin involving the graft reaction and phase transition presents technically very difficult problems. Moreover, as compared with the ABS resin employing an unsaturated rubber substrate, the AES resin utilizes EPDM which is inferior in compatibility with the resin phase, resulting in insufficient adhesion at the interface. To improve the compatibility, it is required to increase the grafting degree to a higher level than that of the ABS resin, but this is not easy because of the low degree of unsaturation of EPDM characteristic of the AES resin. Thus, the manufacture of the AES resin by the continuous polymerization involves still more difficult problems.

It has heretofore been generally accepted that in the batchwise polymerization, a reaction is first caused in the homogeneous solution state, and the grafted high polymer formed by this reaction makes good compatibility at the interface between the resin phase and the rubber particles to allow the interface energy to decrease, and hence, it seems that the grafted high polymer acts as a surfactant to disperse the rubber in the form of relatively small particles. Accordingly, the importance of the reaction prior to the occurrence of phase transition has been generally recognized. For this reason it has been generally considered to be recommendable to carry out the polymerization in such a manner that the polymerization system in the first polymerizer is kept from phase separation by maintaining the polymerization conversion in the first polymerizer low, or by effecting the polymerization without stirring the system, or by properly selecting the type and quantity of the solvent; and in the second polymerizer the phase transition is allowed to take place; or even if the phase transition is allowed to occur in the first polymerizer, the polymerization conversion is maintained as low as possible.

The present inventors have made examinations on the continuous solution polymerization for producing the AES resin from the viewpoint outlined above and have found that under the above-mentioned conditions only unsatisfactory results of impact resistance, hardness, gloss, etc. are obtained, and that when the continuous polymerization has been conducted while maintaining the polymerization conversion in the first polymerizer at a level much higher than the critical value at which the phase transition takes place as shown in Reference Examples which appear hereinafter, a resin having surprisingly excellent properties can be obtained.

An object of this invention is to provide a process for the continuous solution-graft-polymerization of an aromatic vinyl compound and a vinyl cyanide compound onto EPDM.

Another object of this invention is to provide a continuous process for producing an AES resin excellent in impact strength, gloss, hardness, chemical resistance and weather resistance.

Other objects and advantages of this invention will become apparent from the following description.

According to this invention, there is provided an improved process for the continuous production of a rubber-modified thermoplastic resin by the solution-graft-polymerization of a monomer mixture of an aromatic vinyl compound and a vinyl cyanide compound onto an EPDM in the presence of an inert solvent comprising an aromatic hydrocarbon as an essential component, characterized in that two or more polymerizers connected in series to one another are used, said EPDM is fed to the first polymerizer in the form of a homogenous solution in a part or whole of said monomers and/or said inert solvent, together with the remaining monomer or monomers and/or inert solvent; the rubber is dispersed in the first polymerizer and said monomers are polymerized with stirring until the conversion reaches 40 to 80% by weight based on the monomers, and the polymerization is continued with stirring in the second and succeeding polymerizers to substantially complete the polymerization, whereby a resin containing 5 to 30% by weight of EPDM is ultimately obtained.

Although not entirely clear the reason for the formation of a resin having excellent properties by the process of this invention seems to be as follows: A homogeneous solution of starting materials is fed to the first polymerizer where the polymerization system is under such phase equilibrium conditions that EPDM in the feed solution must immediately precipitate. The precipitated EPDM is dispersed in the form of fine granules by vigorous stirring. Owing to a large difference in phase equilibrium conditions between the feed solution and the polymerization system in the polymerizer and to a large shearing force exerted to the precipitated EPDM, there is instantaneously formed a dispersion of EPDM particles of small size which is maintained throughout the course of polymerization, leading to the resin with excellent properties.

It has been found that according to this invention a sufficiently high grafting degree can be attained even when no reaction is effected before the phase transition. Although the grafting degree distribution of the resin produced according to this invention is not exactly confirmed because of the difficulty in its determination, the ungrafted EPDM content has been found to be insignificantly small as determined by the extraction with an aliphatic hydrocarbon solvent in which the ungrafted EPDM is soluble.

Further, a rubber-modified thermoplastic resin manufactured by the conventional solution polymerization has a disadvantage of poor gloss, as is the case with the AES resin. One of the advantages of this invention is that an article having a high gloss can be obtained in spite of the fact that the AES resin is produced by a continuous solution polymerization in this invention. Although the factors affecting the gloss are complicated, it has been known that the most important factors are the particle size of rubber and its distribution. In the resin produced according to this invention, the particle size of rubber seems to be adequately small and uniform. In fact, the observation under an electron microscope revealed that the rubber particles have a uniform size of 0.3 to 0.7μ.

Thus, the resin obtained by the process of this invention is characterized by the well-balanced impact resistance and hardness, the excellent resistance to weather and chemicals, and the high gloss.

Another advantage of this invention is a high productivity.

The EPDM suitable for use in this invention comprises ethylene and propylene in a weight ratio of from 90:10 to 20:80. The non-conjugated diene content is preferably in the range of 4 to 50 in terms of iodine number. The non-conjugated diene may be any of the norbornenes such as alkenylnorbornenes and alkylidene-norbornenes, cyclic dienes such as dicyclopentadiene and aliphatic dienes such as hexadienes. The amount of EPDM used should be such that the rubber content of the final resin be 5 to 30% by weight. The EPDM should be fed to the reaction system in the form of a homogeneous solution in a part or whole of the monomers and/or the inert solvent. Preferably, the EPDM is dissolved in a part or whole of the aromatic vinyl compound or in a part or whole of the inert solvent or in a solution of the monomer or monomers in the inert solvent.

The aromatic vinyl compounds used in this invention include, for example, styrene and its derivatives such as α-methylstyrene, halogenated styrenes, 3,5-dimethylstyrene, tert-butylstyrene and the like.

The vinyl cyanide componds for use in this process include acrylonitrile and its derivatives such as methacrylonitrile. A portion of the monomers can be replaced by other vinyl monomers such as methacrylates and acrylates, e.g. methyl methacrylate, methyl acrylate and the like, acrylic acid, methacrylic acid, acrylamide, methacrylamide, vinyl halides, vinyl ethers, maleic anhydride, and other copolymerizable vinyl compounds. The amount of said other vinyl monomers used is preferably up to 20% by weight based on the total weight of the monomers. The preferable monomer combination is a combination of styrene with acrylonitrile in a weight ratio of 90–60:10–40.

The inert solvent for use in the process comprises as an essential component an aromatic hydrocarbon. Such aromatic hydrocarbons include, for example, benzene, toluene, ethylbenzene, xylene and isopropylbenzene. It is not objectionable to use 30% by weight or less (based on the total inert solvent) of polar solvents such as ketones, esters, ethers, amides and halogenated hydrocarbons. However, the joint use of the aromatic hydrocarbons with aliphatic hydrocarbon is undesirable. The suitable amount of the inert solvent used is 50 to 200, preferably 60 to 200, parts by weight per 100 parts by weight of EPDM and monomers in total.

A radical polymerization initiator is necessary in the process of this invention. Although any radical initiator may be used, it is preferred to use organic peroxides effective for the graft polymerization such as aromatic diacyl peroxides, e.g. dibenzoyl peroxide; peroxyesters, e.g. tert-butyl peroxyisobutyrate, tert-butyl peroxy-2-ethyl-hexanoate, tert-butyl peroxylaurate and tert-butyl peroxybenzoate; peroxycarbonates, e.g. tert-butyl peroxyisopropylcarbonate; and ketone peroxides, e.g. 1,1-bis-tert-butylperoxy-3,3,5-trimethylcyclohexanone.

It is not only possible but also sometimes preferable to use the above peroxides in combination of two or more, or to use jointly with other radical initiators, or to use different initiators in each polymerizer. In the first polymerizer, it is preferable to use at least one of the peroxides given above. Although the amount of the peroxide used may be such that the polymerization conversion in the first polymerizer is in the range of 40 to 80% by weight based on the weight of the monomers, depending upon the polymerization temperature, residence time and intended molecular weight, it is preferable to use about 0.1 to about 2.0 parts by weight per 100 parts by weight of the sum of EPDM and the monomers.

The polymerizer may be of any type so long as it is provided with an impeller capable of exerting sufficient mixing and agitating effect throughout the polymerization system. At least two polymerizers should be used and connected in series. If only one polymerizer is used, a very long residence time is required to substantially complete the polymerization and even if a polymerization conversion of 40 to 80% or more is attained, the resulting polymer is inferior in physical properties as shown later (Comparative Examples 4 and 5). In the continuous polymerization, there occurs the residence time distribution as previously described and a portion of the EPDM with a very small residence time remains possibly ungrafted. The probability of the occurrence of such a phenomenon is greatly reduced and the time required for substantially completing the polymerization is also reduced by using plural polymerizers connected in series. For this reason, it is desirable to use 3 or 4 polymerizers connected in series. The use of too many polymerizers requires excessive investment for the construction of plant and is undesirable from the economical as well as operational viewpoints.

In carrying out the process of this invention, the polymerization conversion in the first polymerizer is in the range of from 40 to 80, preferably from 50 to 75% by weight, based on the monomers, and the average grafting degree is controlled preferably to 30% by weight or more. The lower limit of conversion is 40% by weight, because otherwise the impact resistance and gloss become inferior as described previously. The upper limit of polymerization conversion has the following meaning: The important roles played by the polymerization in the second and succeeding polymerizers are to increase the grafting degree on the average and to decrease the breadth of its distribution, as well as to decrease and make uniform the particle size of the rubber dispersion formed in the first polymerizer. If the amount of residual monomers to be polymerized in the second and succeeding polymerizers is too small, the above effects can hardly be obtained. Therefore, the polymerization conversion in the first polymerizer should be maintained below 80%. Agitation is necessary in the second and succeeding polymerizers. The polymerization should be substantially completed (the term "substantial completion", as herein used, means a final polymerization conversion of at least 85%, preferably 90% or more). This is because the intended higher and uniform grafting degree as well as smaller and uniform particle size, as described above, are better attained by complete polymerization.

According to this invention, the feed should be a homogeneous solution of EPDM. It is to be noted in this case that a vinyl cyanide compound does not dissolve EPDM. For instance, in preparing the rubber solution, if the proportion of a vinyl cyanide compound is large and the temperature is low, the rubber will be sparingly soluble. In another case, if a vinyl cyanide compound is added to a homogeneous solution of EPDM in an aromatic hydrocarbon, EPDM will sometimes be precipitated depending upon the temperature and composition. If such a solution as contains precipitated rubber is fed to the first polymerizer, a fine dispersion of rubber particles is not obtained and the polymer obtained from such a heterogeneous solution will not show good physical properties.

It is possible to feed a part of the monomers and solvent to the second and succeeding polymerizers, taking precautions against the disturbance of phase equilibrium which may injure the stability of EPDM dispersion.

The polymerization temperature is selected, in consideration of the decomposition temperature of the initiator, from the range of temperatures at which the conventional radical polymerization is carried out. The preferred temperature is in the range of from 60° to 150° C. It is also possible to elevate the temperature gradually from the first polymerizer to the last.

The recovery of the objective resin, unreacted monomers, and the inert solvent from the polymerization mixture can be performed in a customary manner without needing any special technique. In view of the economical advantage and the uniformity of product quality characteristic of the continuous polymerization process as in this invention, it is preferable to employ, if possible, a continuous method of recovery. An example of the method is a method of continuously recovering the volatile matter and resin pellets by means of a vent type extruder after or without preliminary concentration by flash evaporation.

Although the resin obtained by the process of this invention possesses excellent properties, it can be further incorporated, if necessary, with lubricants such as liquid paraffin, fatty esters, fatty amides, metal salts of fatty acids, polysiloxanes or the like; antioxidants of the phenol type, amine type, thioester type or phosphorous acid ester type, and if necessary, UV absorbers. These additives can be incorporated into the final resin or added to the polymerization system before or after polymerization.

The invention is illustrated below in detail with reference to Examples which are merely illustrative and not limitative.

In the Examples, the grafting degree was determined in the following manner:

One gram of the resin was dissolved with shaking in 40 ml of methyl ethyl ketone (MEK) (24 hours) and centrifuged (at 8,000 rpm for 30 minutes) twice to collect the fraction insoluble in MEK. The acrylonitrile (AN) content was determined from the nitrogen content in the said fraction and the grafting degree was calculated by the following equations, the percentages being all by weight:

$$A = \frac{(100 - \text{rubber content (\%)}) \times \left(\begin{array}{l}\text{AN content (\%) in}\\ \text{MEK-insolubles}\end{array}\right)}{\text{AN content (\%) in total resin}}$$

$$\text{Grafting degree (\%)} = \frac{A}{100 - A} \times 100$$

The rubber content was calculated from the polymerization conversion and the feed composition.

EXAMPLE 1

The polymerization apparatus used was composed of three polymerizers which were connected in series, each of which had a capacity of 30 liters, and was provided with a helical ribbon impeller. Polymerization was carried out under the conditions shown in Table 1, which are also summarized in Table 2 in terms of parts by weight. The residence time given in Table 2 was an approximate value estimated by assuming the liquid specific gravity to be 0.87 g/ml.

TABLE 1

|  | Feeding rate (g/hour) | Polymerization temperature (°C.) | Impeller speed (rpm) | Polymerization conversion (% by weight) |
|---|---|---|---|---|
| First polymerizer |  | 80 | 60 | 52 |
| EPDM | 489 |  |  |  |
| Styrene | 1940 |  |  |  |
| Acrylonitrile | 831 |  |  |  |
| Toluene | 2934 |  |  |  |
| t-Dodecylmercaptan | 3.2 |  |  |  |
| BPO | 13 |  |  |  |
| Second polymerizer |  | 80 | 60 | 74 |
| BPO | 6.5 |  |  |  |
| Toluene | 163 |  |  |  |
| Third polymerizer |  | 80 | 60 | 88 |
| BPO | 6.5 |  |  |  |
| Toluene | 163 |  |  |  |
| Exit of third polymerizer |  |  |  |  |
| Irganox 1076 | 3.3 |  |  |  |

TABLE 1-continued

|  | Feeding rate (g/hour) | Polymerization temperature (°C.) | Impeller speed (rpm) | Polymerization conversion (% by weight) |
|---|---|---|---|---|
| Toluene | 163 |  |  |  |

Note:
EPDM: JSR EP24 (a trade name of Japan Synthetic Rubber Co., Ltd.; termonomer: ethylidene-norbornene, Mooney-viscosity $ML_{1+4}^{100°C}$ 65, Iodine number 15)
BPO: benzoyl peroxide
Irganox 1076: a trade name of Chiba Geigy for antioxidant of phenol type BPO was fed as a 5% by weight solution in toluene through a separate piping. The other components were fed as a homogeneous solution at 60° C. The polymerization temperature was regulated by heating or cooling through a jacket. The feed entered each of the three connected polymerizers from the bottom and was allowed to overflow from the top. The polymerization mixture was cooled down to 60° C., stored temporarily in a tank, and sent directly to a three-vent extruder, 65 mm in diameter, where the volatiles were removed at 250° C. while the AES resin was recovered in the form of strand-cut pellets. The polymerization was carried out continuously for a period of 60 hours and the polymerization mixture obtained in the last stage was subjected to evaluation.

Test specimens were prepared by means of a 5-oz. injection molding machine (230° C.) and tested for physical properties in a conventional manner. The results obtained were as shown in Table 2. As seen from Table 2, the melt fluidity, impact resistance and static strength were well-balanced, and, in addition, the gloss was excellent. The model molding test showed smooth surface appearance and no appreciable delamination. Upon immersion in hexane at room temperature for 3 days, the weight increase was less than 1% by weight, extraction of EPDM with hexane was not detected, and the change in appearance was not observed.

REFERENCE EXAMPLE

Using the same feed composition as in Example 1 a batchwise polymerization was conducted at 80° C. in a 10-liter autoclave provided with a helical ribbon impeller. A phenomenon of sudden viscosity decrease was observed at a polymerization conversion of about 18%, indicating the occurrence of phase transition. From this fact it is presumable that in Example 1 the equilibrium point for the phase transition is at about 18% conversion. When one drop of the polymerization mixture in the first polymerizer in Example 1 was added to MEK and gently stirred, there appeared turbidity. A portion of the said mixture was vacuum-dried and observed under an electron microscope by using the OsO$_4$-fixation technique. The rubber was found to have been dispersed in the form of granule.

EXAMPLES 2 to 11

A series of polymerization experiments were conducted following the procedure of Example 1 under the conditions shown in Table 2. The meanings of the abbreviations in Table 2 are as shown later.

In Examples 2 to 4, the type and amount of the initiator and the polymerization temperature were varied. The results were as good as those in Example 1. In Example 5, using two initiators the polymerization temperature was elevated stepwise. In Example 6, the amount of EPDM was different from those in the other Examples; a higher impact strength was obtained. In Example 7, use was made of JSR EP82 (termonomer, dicyclopentadiene; Mooney viscosity, 38; iodine number, 10) which is a type of EPDM different from the EPDM used in other Examples. The results obtained were similar to those in the other Examples. In Example 8, MEK was used in combination with toluene, and in Example 9 ethylbenzene was used as the solvent. In Example 10, methyl methacrylate, a vinyl monomer, was used in combination with other monomers. The resulting resin showed good properties, though somewhat different from other resins in the balance of physical properties and in the color, etc. All of the resins obtained in the above Examples showed a good balance among melt fluidity, impact resistance and static strength. The delamination test and hexane immersion test had no problem. In Example 11, two polymerizers were employed and the polymerization conditions were adjusted to those of the present process by controlling the residence time. The physical properties of the resulting resin were as good as those of the resins obtained in the other Examples, except that a slight amount of EPDM was found in the hexane extract.

COMPARATIVE EXAMPLE 1

Polymerization was carried out in the same manner as in Example 1, except that a polymerizer having a capacity of 1.5 liters was used as the first polymerizer. In this polymerizer the residence time was short, the polymerization conversion was low, and the phase transition did not take place. When a drop of the polymerization mixture was added to MEK, it coagulated into a mass which did not disperse, indicating that the rubber phase was continuous in the polymerization mixture. The resulting resin showed a low impact strength and very poor gloss.

COMPARATIVE EXAMPLE 2

Polymerization was carried out in the same manner as in Example 3, except that the initiator was subdivided into portions and a small portion was added to the first polymerizer. In this polymerizer, although the phase transition was completed, the polymerization conversion was 30% which was lower than that specified in this invention. The resulting resin showed inferior gloss.

COMPARATIVE EXAMPLE 3

A combination of benzoyl peroxide and dicumyl peroxide was used as the initiator as in Example 5. The polymerization conversion in the first polymerizer was kept low by decreasing the polymerization temperature. The same results as those in Comparative Example 1 were obtained.

COMPARATIVE EXAMPLE 4

By using a single polymerizer, polymerization was carried out under the same conditions as those in the first polymerizer of Example 3. The resulting resin showed a markedly inferior impact strength and a low grafting degree; delamination was observed in the flexural test of a molded specimen.

COMPARATIVE EXAMPLE 5

Polymerization was carried out by using a single polymerizer as in Comparative Example 4, but the residence time was prolonged and the temperature was somewhat higher to increase the polymerization conversion. The resin showed a higher grafting degree and a somewhat higher impact strength than those of the resin of Comparative Example 4. The delamination was great and some EPDM was extracted on immersion in hexane, suggesting the presence of rubber molecules of low grafting degree.

TABLE 2

| | | Example 1 | Example 2 | Example 3 | Example 4 | Example 5 | Example 6 |
|---|---|---|---|---|---|---|---|
| Feed composition | | | | | | | |
| EPDM Type | | EP-24 | EP-24 | EP-24 | EP-24 | EP-24 | EP-24 |
| EPDM Quantity | Parts (wt.) | 15 | 15 | 15 | 15 | 15 | 20 |
| Styrene quantity | " | 59.5 | 59.5 | 59.5 | 59.5 | 59.5 | 56 |
| Acrylonitrile | " | 25.5 | 25.5 | 25.5 | 25.5 | 25.5 | 24 |
| Solvent Type | | Toluene | Toluene | Toluene | Toluene | Toluene | Toluene |
| Solvent Quantity | " | 90\|5\|5 | 100 | 100 | 100 | 100 | 110 |
| Initiator Type | | BPO | PH3M | PBZ | PBI | BPO/PCD | PBZ |
| Initiator Quantity | " | 0.4\|0.2\|0.2 | 0.40 | 0.35 | 0.35 | 0.4/0.1 | 0.35 |
| Polymerizer (1st/2nd/3rd) | | | | | | | |
| Residence time | Hour | 4.2\|4.1\|4 | 4\|4\|4 | 4\|4\|4 | 4\|4\|4 | 4\|4\|4 | 4\|4\|4 |
| Temperature | °C. | 80\|80\|80 | 95\|95\|95 | 105\|105\|105 | 100\|100\|100 | 80\|100\|120 | 105\|110\|120 |
| Conversion | % | 52\|74\|88 | 62\|85\|92 | 67\|88\|95 | 65\|84\|93 | 52\|88\|96 | 62\|89\|97 |
| Grafting degree | % | 73 | 65 | 64 | 68 | 70 | 68 |
| Physical property | | (35\|54\|73) | (40\|55\|65) | | (36\|46\|68) | | |
| Melt fluidity | $\times 10^{-3}$ ml/sec | 16.0 | 11.0 | 8.3 | 8.0 | 14.0 | 9.8 |
| Izod impact strength | notched kg . cm/cm | 21.2 | 18.8 | 20.5 | 22.4 | 20.8 | 33.2 |
| Izod impact strength ($-30°$ C.) | notched kg . cm/cm | 6.3 | 5.2 | 6.0 | 6.5 | 6.2 | 8.5 |
| Rockwell hardness | R scale | 100 | 103 | 104 | 105 | 103 | 93 |
| Tensile strength | Kg/cm$^2$ | 420 | 470 | 480 | 480 | 450 | 410 |
| Tensile elongation | % | 35 | 25 | 26 | 25 | 33 | 30 |
| Gloss | % | 82 | 84 | 83 | 85 | 78 | 75 |
| Deflection temperature | °C. | 92 | 92 | 91 | 92 | 90 | 89 |

| | | Example 7 | Example 8 | Example 9 | Example 10 | Example 11 |
|---|---|---|---|---|---|---|
| Feed composition | | | | | | |
| EPDM Type | | EP-82 | EP-24 | EP-24 | EP-24 | EP-24 |
| EPDM Quantity | Parts (wt.) | 15 | 15 | 15 | 15 | 15 |
| Styrene quantity | " | 59.5 | 59.5 | 59.5 | 50 | 59.5 |

TABLE 2-continued

|  |  |  |  |  |  |  |
|---|---|---|---|---|---|---|
| Acrylonitrile | " | 25.5 | 25.5 | 25.5 | 20 (MMA 15) | 25.5 |
| Solvent Type | " | Toluene | Toluene/MEK | Ethylbenzene | Toluene | Toluene |
| Quantity |  | 100 | 80/20 | 100 | 100 | 100 |
| Initiator Type | " | PBZ | PBZ | PBZ | PBZ | PBZ |
| Quantity |  | 0.35 | 0.35 | 0.35 | 0.35 | 0.35 |
| Polymerizer (1st/2nd/3rd) |  |  |  |  |  |  |
| Residence time | Hour | 4\|4\|4 | 4\|4\|4 | 4\|4\|4 | 4\|4\|4 | 6\|6 |
| Temperature | °C. | 105\|105\|105 | 105\|105\|105 | 105\|105\|105 | 105\|105\|105 | 105\|105 |
| Conversion | % | 64\|86\|92 | 68\|88\|94 | 63\|82\|91 | 63\|84\|92 | 75\|89 |
| Grafting degree | % | 62 | 65 | 63 | 66 | 66 |
| Physical property |  |  |  |  |  |  |
| Melt fluidity | × 10⁻³ml/sec | 9.5 | 7.8 | 12.0 | 14.5 | 10.0 |
| Izod impact strength | notched kg . cm/cm | 17.3 | 21.2 | 19.3 | 18.8 | 20.4 |
| Izod impact strength (−30° C.) | notched kg . cm/cm | 5.8 | 6.2 | 6.0 | 5.2 | 5.8 |
| Rockwell hardness | R scale | 107 | 107 | 104 | 103 | 106 |
| Tensile strength | Kg/cm² | 500 | 500 | 470 | 420 | 490 |
| Tensile elongation | % | 25 | 26 | 25 | 35 | 22 |
| Gloss | % | 82 | 70 | 84 | 86 | 84 |
| Deflection temperature | °C. | 92 | 91 | 91 | 88 | 92 |

|  |  | Comparative Example 1 | Comparative Example 2 | Comparative Example 3 | Comparative Example 4 | Comparative Example 5 |
|---|---|---|---|---|---|---|
| Feed composition |  |  |  |  |  |  |
| EPDM Type | | EP-24 | EP-24 | EP-24 | EP-24 | EP-24 |
| Quantity | Parts (wt.) | 15 | 15 | 15 | 15 | 15 |
| Styrene quantity | " | 59.5 | 59.5 | 59.5 | 59.5 | 59.5 |
| Acrylonitrile | " | 25.5 | 25.5 | 25.5 | 2.5 | 25.5 |
| Solvent Type | " | Toluene | Toluene | Toluene | Toluene | Toluene |
| Quantity | | 100 | 95/5 | 100 | 100 | 100 |
| Initiator Type | " | PBZ | PBZ | BPO/PCD | PBZ | PBZ |
| Quantity | | 0.35 | 0.05\|0.3 | 0.4/0.1 | 0.35 | 0.35 |
| Polymerizer (1st/2nd/3rd) |  |  |  |  |  |  |
| Residence time | Hour | 0.2\|4\|4 | 4.1\|4\|4 | 4\|4\|4 | 40 | 12 |
| Temperature | °C. | 105\|105\|105 | 105\|105\|105 | 60\|90\|120 | 105 | 110 |
| Conversion | % | 12\|72\|90 | 30\|75\|91 | 12\|76\|93 | 68 | 85 |
| Grafting degree | % | 68 | 64 | 70 | 40 | 62 |
| Physical property |  |  |  |  |  |  |
| Melt fluidity | × 10⁻³ml/sec | 8.0 | 19.8 | 13.0 | 6.5 | 15.2 |
| Izod impact strength | notched kg . cm/cm | 12.0 | 15.2 | 14.0 | 3.2 | 8.3 |
| Izod impact strength (−30° C.) | notched kg . cm/cm | 4.5 | 4.7 | 2.5 | 1.5 | 2.5 |
| Rockwell hardness | R scale | 98 | 100 | 98 | 85 | 105 |
| Tensile strength | Kg/cm² | 380 | 410 | 380 | 320 | 480 |
| Tensile elongation | % | 30 | 35 | 30 | 15 | 15 |
| Gloss | % | 25 | 58 | 30 | 82 | 83 |
| Deflection temperature | °C. | 90 | 91 | 89 | 89 | 91 |

Note to Table 2:
JSR EP-82: A trade name of Japan Synthetic Rubber Co. for EPDM (termonomer, dicyclopentadiene; Mooney viscosity, ML$_{1+4}^{100°}$ C., 38; iodine number, 10)
PH3M: 1,1-Bis-t-butylperoxy-3,3,5-trimethylcyclohexane
PBZ: t-Butyl peroxybenzoate
PCD: Dicumyl peroxide
1 Melt fluidity: Rate of flow from a nozzle, 1 mm diameter × 2mm length, of a "Koka Type Flow Tester" at 200° C. under a load of 30 kg/cm².
2 Izod impact strength: Notched specimen, ¼ × ½ in. in cross-section; ASTM D 256-56
3 Tensile test: ASTM D638-617
4 Gloss: Reflectance at the specular direction; incident angle, 45°; JIS Z 8741
5 Deflection temperature: ASTM D 648; 18.6 kg/cm², not annealed.

What is claimed is:

1. A process for continuously producing an impact-resistant resin having a rubber content of 5 to 30% by weight by solution-graft-polymerization of a monomer mixture of an aromatic vinyl compound and a vinyl cyanide compound in the presence of an ethylene-propylene-non-conjugated diene terpolymer rubber and at least one radical polymerization initiator in an inert solvent containing as an essential component an aromatic hydrocarbon, comprising:

feeding to the first polymerizer of a series of at least two polymerizers, said rubber in the form of a homogeneous solution containing a portion or all of said monomers and/or said inert solvent, together with the remaining monomer or monomers and/or inert solvent;

dispersing the rubber in the first polymerizer and polymerizing with stirring said monomers until the polymerization conversion reaches 40 to 80% by weight based on the monomers; and further polymerizing the remaining monomers with stirring in the second and succeeding polymerizers to substantially complete the polymerization.

2. The process according to claim 1, wherein three of four polymerizers are connected in series.

3. The process according to claim 1, wherein in the first polymerizer the monomers are polymerized until the polymerization conversion reaches 50 to 75% by weight.

4. The process according to claim 1, wherein the final polymerization conversion is at least 90% by weight.

5. The process according to claim 1, wherein the polymerization is conducted at a temperature of 60° to 150° C.

6. The process according to claim 1, wherein the EPDM has an ethylene to propylene weight ratio of from 90:10 to 20:80 and a non-conjugated diene content of 4 to 50 in terms of iodine number.

7. The process according to claim 1, wherein the non-conjugated diene is norbornene, a cyclic diene or an aliphatic diene.

8. The process according to claim 1, wherein the aromatic vinyl compound is styrene, α-methylstyrene, a halogenated styrene, 3,5-dimethylstyrene or tert-butylstyrene.

9. The process according to claim 1, wherein the vinyl cyanide compound is acrylonitrile or methacrylonitrile.

10. The process according to claim 1, wherein the monomer mixture further contains a methacrylate, an acrylate, acrylic acid, methacrylic acid, acrylamide, methacrylamide, a vinyl halide, a vinyl ether or maleic anhydride.

11. The process according to claim 1, wherein the aromatic hydrocarbon is benzene, toluene, ethylbenzene, a xylene or isopropylbenzene.

12. The process according to claim 11, wherein the inert solvent comprises no more than 30% by weight of a ketone, ester, ether, amide or halohydrocarbon.

13. The process according to claim 1, wherein said at least one radical polymerization initiator is selected from the group consisting of aromatic diacyl peroxides, peroxyesters, peroxycarbonates, and ketone peroxides.

14. A process for continuously producing an impact-resistant resin having a rubber content of 5–30% by wt. by solution-graft-polymerization of a monomer mixture of an aromatic vinyl and a vinyl cyanide compound in the presence of an ethylene-propylene-non-conjugated diene terpolymer rubber and at least one radical polymerization initiator in an inert solvent consisting of an aromatic hydrocarbon combined with no more than 30 wt. %, based on the total amount of inert solvent, of a polar solvent, comprising:

feeding to the first polymerizer of a series of at least two polymerizers, said rubber in the form of a homogeneous solution containing a portion or all of said monomers and/or said inlet solvent, together with the remaining monomer or monomers and/or inert solvent;

dispersing the rubber in the first polymerizer and polymerizing with stirring said monomers until the polymerization conversion reaches 40 to 80% by wt. based on the monomers; and further polymerizing the remaining monomers with stirring in the second and succeeding polymerizers to substantially complete the polymerization.

15. The process of claim 14, wherein said polar solvent is selected from the group consisting of a ketone, an ester, an ether, an amide, or a halohydrocarbon.

* * * * *